United States Patent [19]
Morin

[11] 3,807,956
[45] Apr. 30, 1974

[54] MODIFIED BIURET REAGENT FOR GLASS STORAGE AND METHOD

[75] Inventor: Leo G. Morin, Miami, Fla.

[73] Assignee: The First National Bank of Miami, Miami, Fla.

[22] Filed: Aug. 30, 1972

[21] Appl. No.: 284,880

[52] U.S. Cl. ........... 23/230 B, 23/230 R, 23/253 R, 252/408
[51] Int. Cl. .......................................... G01n 33/16
[58] Field of Search ................. 23/230 B; 252/408

[56] References Cited
UNITED STATES PATENTS
3,310,382  3/1967  Kingsley ........................ 23/230 B Primary Examiner—Morris O. Wolk
Assistant Examiner—R. E. Serwin
Attorney, Agent, or Firm—Fisher, Christen & Sabol

[57] ABSTRACT

A modification of the biuret reagent with zirconium and reduced alkalinity to make the reagent suitable for storage in glass is disclosed. The performance of the modified reagent in measuring protein is not reduced.

11 Claims, No Drawings

MODIFIED BIURET REAGENT FOR GLASS STORAGE AND METHOD

BACKGROUND OF THIS INVENTION

1. Field of this Invention

This invention relates to a modification of the biuret reagent so that it may be stored in glass.

2. Prior Art

The determination of protein in biological fluids with the biuret reagent is a useful and frequently performed test in clinical laboratories. The biuret reagent is stable at room temperature for several years. It must, however, be stored in a plastic or other non-glass container, since it will slowly react with glass. This is a problem for commercial suppliers, since biuret reagent supplied in glass tubes or ampules that are used as both the reaction tube and the cuvette for measurement in colorimeters has a shelf life of about 3 months only. There is a genuine commercial need for a modified biuret reagent that will not react with glass for a minimum of a year.

BROAD DESCRIPTION OF THIS INVENTION

The primary object of this invention is to provide a biuret reagent that will not react with glass for at least a year.

Another object is to provide a biuret reagent that may be stored in glass tubes or ampules.

Still another object is to provide a biuret reagent that will not have diminished capacity as a protein indicator.

It has been found that with the addition of zirconium ions and the reduction of alkalinity, the biuret reagent will maintain its capacity to indicate proteins, yet will not interact with glass and becomes suitable for storage in glass tubes and ampules. Broadly speaking, this invention is practised by reducing the hydroxide content of any conventional biuret reagent to 0.1 to 2 gram percent and adding 0.01 to 0.5 gram percent of a water soluble zirconium salt.

The biuret reagent of this invention will not react with glass for at least one year, can be stored in glass containers and does not have diminished capacity as a protein indicator after having been stored in glass containers for at least one year.

This invention further includes the process of using the novel biuret reagent of this invention to determine the protein content of biological fluids, such as blood, by colorimetric means or similar means.

This biological fluid can be those of man or animal. Examples of such biological fluids are serum, plasma, urine and spinal fluid.

DETAILED DESCRIPTION OF THIS INVENTION

A large number of biuret reagents are known. All of them (within the scope of this invention) involve the reaction of copper (cupric form) in the presence of large amounts of a strong base, such as sodium hydroxide, with protein to produce a violet color. This invention involves the modification of any biuret reagent which contains cupric ions and a high pH (due to the presence of an amount of a hydroxide base). So when the phrase "a biuret reagent" or "the biuret reagent" is used herein, it generally refers to the above formulation (unless it is obvious that the modified biuret reagent of this invention is being referred to).

Such biuret reagents often contain other non-essential ingredients, and this invention covers such biuret reagents. The biuret reagents often contain copper chelating agents, such as sodium potassium tartrate, citrates and ethylenediamine tetracetic acid, and ingredients, such as potassium iodide. The biuret reagent also contains surfactants, such as the Tritons, e.g., Triton X-100 and Triton X-155, sodium salts of high molecular weight, alkyl sulfates or sulfonates, Merpol SE, Zonyl A, Merpol HCS, and the Igepal CA's, such as Igepal CA 630.

Examples of useful cupric compounds are cupric perchlorate, cupric sulfate, cupric acetate, cupric butyrate, cupric bromate, cupric chlorate, cupric bromide, cupric chloride, cupric fluoride, cupric dichromate, cupric formate, cupric iodate, cupric lactate, cupric orthophosphate, cupric laurate, cupric salicylate, cupric nitrate, cupric tartrate and cupric oxalate.

The term alkali hydroxide includes the hydroxides of alkali metals, such as potassium hydroxide, sodium hydroxide, lithium hydroxide, rubidium hydroxide, cesium hydroxide, and francium hydroxide; of the alkaline earth metals, such as barium hydroxide, calcium hydroxide, strontium hydroxide, and radium hydroxide, and of the ammonium radical (ammonium hydroxide). The preferred alkali hydroxide is sodium hydroxide. Other useful hydroxides include such metal hydroxides such as lead hydroxide, silver hydroxide, zinc hydroxide, iron hydroxide and beryllium hydroxide, and organic hydroxides such as hydroxylamine. A strong hydroxide should be used. This invention involves lowering the hydroxide content to below a certain level.

Examples of useful water-soluble zirconium salts are zirconium perchlorate (preferred), zirconium nitrate, zirconium chlorate, zirconium sulfate, zirconium chlorite, zirconium phosphate, zirconium borate, zirconium bromate, zirconium acetate, zirconium sulfite, zirconium tetrachloride, zirconium lactate, zirconium persulfate, zirconium nitrate, zirconium perborate, zirconium oleate, zirconium oxalate, zirconium citrate, zirconium iodate, zirconium bromide, zirconium fluorate, zirconium chloride, zirconium fluoride and zirconium iodide.

Any suitable colorimeter or spectrophotometer can be used to measure the absorbance. Examples of useful colorimeters are: Coleman, Model 44; Perkin-Elmer, Model 124; the colorimeter disclosed in U.S. Ser. No. 224,457, applicants: Raymond W. Kiess and Peter H. Stewart, filed: Feb. 8, 1972, assignee: Kiess Instruments, Inc., 8768 S.W. 131st Street, Miami, Florida, 33156; and the direct reading colorimeter disclosed in U.S. Pat. No. 3,561,878, inventor: R. W. Kiess.

The following examples are included to further illustrate the invention, but they do not limit it.

EXAMPLE 1

To one liter of deionized water is added 2.16 grams of cupric perchlorate, 6 grams of sodium potassium tartrate, 1 gram of zirconium perchlorate, 8 grams of sodium hydroxide, 1 gram of potassium iodide, and 2 ml of Triton X-100 (the trade name for a synthetic organic surface active agent which is a nonionic, water soluble, alkyl aryl polyether alcohol). The solution is dispensed in 2.5 ml lots to a set of ampules and the ampules are sealed. The ampules are stored for one year. On examination, after one year, there is no apparent action on the glass or any signes of degradation. A set of standards made to contain 1, 2, 4, 6, 8 and 10 gram-percent of protein are prepared. To a number of tubes of modified reagent, 50λ of specified levels of protein standards, are added. The absorbance is measured using a Coleman Model 44. There is a linear proportion between absorbance and protein concentration.

EXAMPLE 2

A reagent is prepared as in Example 1 and is tested fresh with standards as in Example 1. The linear proportion is the same as in Example 1.

EXAMPLE 3

A reagent is prepared as in Example 1, except that the sodium hydroxide is raised to 6 gram percent and the zirconium is omitted. The reagent is tested with standards as in Example 1. The linear proportion is the same as in Example 1.

EXAMPLE 4

A reagent is prepared as in Example 3 and is stored for 6 months in glass ampules. There is a translucent clouding of the glass and serious signs of degradation. The reagent is tested as in Example 1. The reagent functions very poorly with a loss of about 60 percent capacity to measure proteins.

What is claimed is:

1. A biuret reagent containing cupric ions in an alkali medium which contains about 2 gram percent or less of an hydroxide and between about 0.01 and 0.5 gram percent of a zirconium salt.

2. A reagent as described in claim 1 wherein said zirconium salt is zirconium perchlorate.

3. A reagent as described in claim 1 wherein said hydroxide is an alkali hydroxide.

4. A reagent as described in claim 1 wherein said alkali hydroxide is sodium hydroxide.

5. A reagent as claimed in claim 1 wherein said hydroxide is present in an amount between 0.1 and about 2 gram percent.

6. A method of preparing a mixture of a biological fluid and a biuret reagent, the absorbance of said mixture being capable of being colorimetrically determined in order to ascertain the protein content of the biological fluid, which comprises admixing a sample of biological fluid and a biuret reagent, which contains cupric ions in an alkali medium that contains about 2 gram percent or less of an hydroxide and between about 0.01 to 0.5 gram percent of a zirconium salt, the ratio of the biological fluid to the reagent being between 1:100 and 1:25.

7. A method as described in claim 6 wherein said zirconium salt is zirconium perchlorate.

8. A method as described in claim 6 wherein said hydroxide is an alkali hydroxide.

9. A method as described in claim 6 wherein said alkali hydroxide is sodium hydroxide.

10. A method wherein the absorbance of a mixture of biological fluid and a biuret reagent, which contains cupric ions in an alkali medium that contains about 2 gram percent or less of an hydroxide and between about 0.01 to 0.5 gram percent of a zirconium salt, is colorimetrically determined, the value of the absorbance being a measure of the protein concentration in the biological fluid, there being a linear proportion between the absorbance and protein concentration.

11. An ampoule containing the biuret reagent of claim 1.

* * * * *